United States Patent [19]

Wagner

[11] 4,060,334

[45] Nov. 29, 1977

[54] MACHINE FOR MACHINING BARS AND TUBES

[75] Inventor: Rudolf Wagner, Stuttgart, Germany

[73] Assignee: Remswerk Christian Föll und Söhne, Waiblingen, Germany

[21] Appl. No.: 650,157

[22] Filed: Jan. 19, 1976

[30] Foreign Application Priority Data

Jan. 18, 1975 Germany .................. 7501376[U]

[51] Int. Cl.² ............................................. B23B 39/10
[52] U.S. Cl. ..................................... 408/126; 74/773; 173/79; 173/163
[58] Field of Search ...................... 408/126, 124; 10/87, 10/89 R; 173/57, 79, 163; 74/773, 776

[56] References Cited

U.S. PATENT DOCUMENTS 3,103,676  9/1963  Kehaly .................................. 173/163

*Primary Examiner*—Gil Weidenfeld
*Attorney, Agent, or Firm*—Walter Becker

[57] ABSTRACT

A machine for machining bars, rods, tubes and similar articles, e.g. by cutting a thread thereinto is provided with a cutting head journalled by means of a spindle or the like on a housing, and is also provided with a motor, e.g. an electric motor, which is axially aligned with the cutting head. Between the motor and the cutting head there is arranged a transmission having a driving or input gear which is drivingly connected to the motor shaft and having an output gear of the transmission drivingly connected to the cutting head. The transmission is a planetary gear transmission which is arranged in axial alignment with the motor and the cutting head.

16 Claims, 2 Drawing Figures

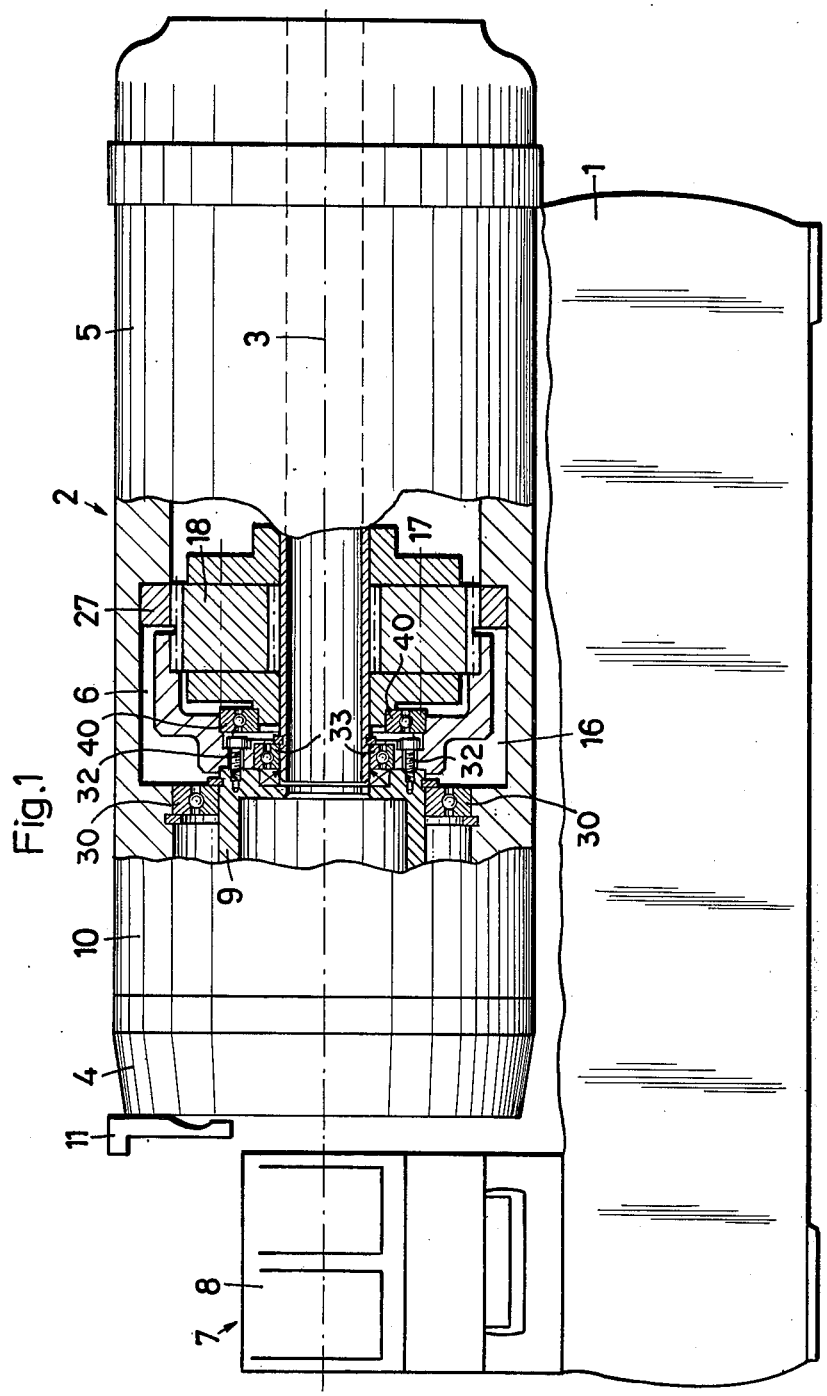

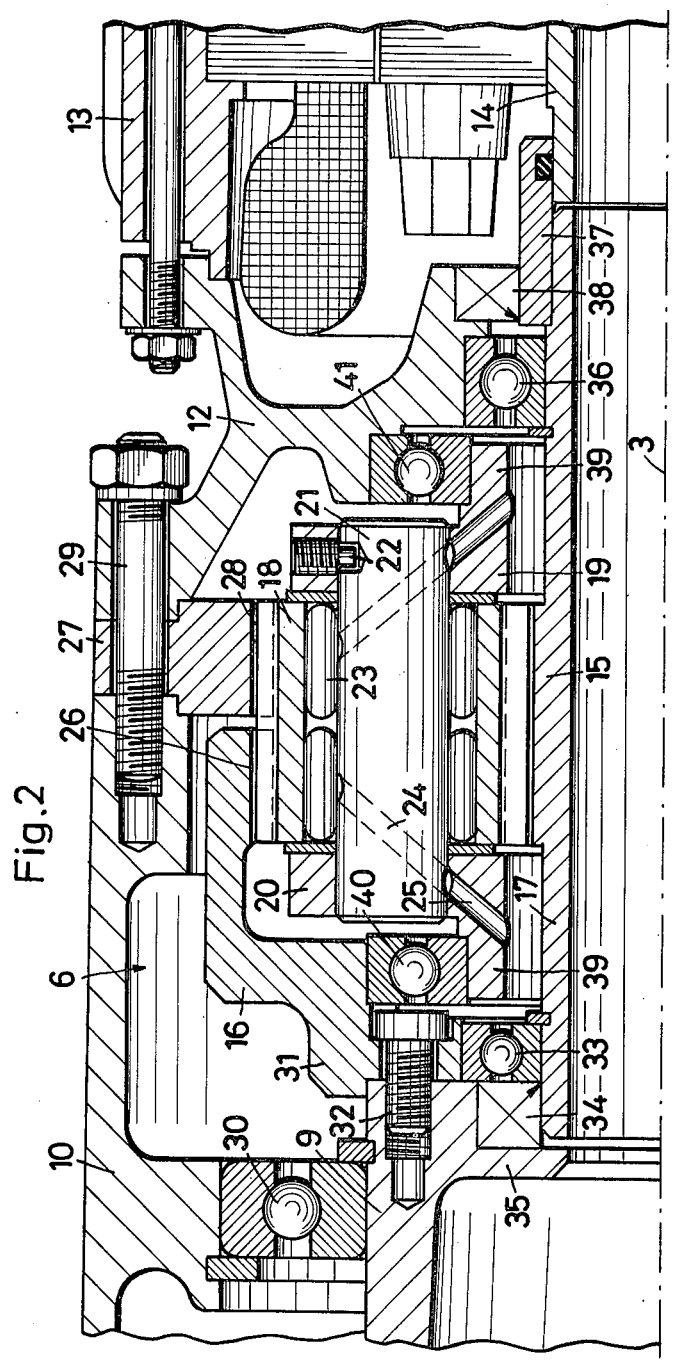

MACHINE FOR MACHINING BARS AND TUBES

The present invention relates to a machine for machining bars, pipes and similar material by thread cutting or the like, and more specifically concerns a machine of the above mentioned type with a cutting head arranged on a housing with a spindle or the like. The machine furthermore comprises a motor which is about coaxial with said cutting head, for instance an electric motor. Between said motor and the cutting head, a transmission is provided, the driving wheel of which is connected to the motor shaft and the output wheel of which is connected to the cutting head.

In connection with the thread cutting machines in which the motor axis is located along the spindle axis of the cutting head, as a rule, for obtaining the customary high step-down transmission ratio of for instance 100:1 between the driving wheel and the output wheel, usually a worm wheel transmission is utilized. Worm wheel drives of this type have a poor degree of efficiency and require considerable space so that a compact design of the machine is rather difficult.

It is, therefore, an object of the present invention to provide a machine for machining bars and papes which will have a high degree of efficiency and will permit a compact design.

These and other objects and advantages of the invention will appear more clearly from the following specification in connection with the accompanying drawings, in which:

FIG. 1 represents a fragmentary axial section through a machine according to the invention.

FIG. 2 illustrates on a larger scale than FIG. 1 a cutout of FIG. 1 in greater detail.

The machine according to the present invention for machining bars, pipes and similar material by thread cutting and the like includes a spindle or the like with a cutter heat and a motor substantially coaxial therewith. The machine is characterized primarily in that the transmission is designed as a planetary gear transmission which is axially aligned with the axis of the driving motor or with the cutting head and may for e.g. a transmission known as "Wolfram transmission".

According to the design of the present invention, it is further possible that the transmission without requiring additional space has a hollow passage which extends from the cutting head and is located about in the axis of the latter. This hollow passage extends at least into the region of the motor or passes through the motor so that the workpieces can be machined over a practically unlimited length. The design according to the invention is suitable particularly for thread-cutting machines for producing an outer thread. The machine may thus also be used for long threads for industrial mass production or for other fields of utilization.

Referring now to the drawings in detail, FIG. 1 shows a machine according to the invention for mounting the machine on a table or the like. A base 1 is provided with the topside thereof having arranged thereon a machine unit 2 with a horizontal axis 3. The machine unit 2 includes a cutting head 4, and electric motor 5, and a transmission 6 and forms a structural unit. The machine unit is displaceably mounted on guiding means of the base 1 for movememt parallel to its axis 3. The topside of that end of the base 1 which is adjacent to the cutting head 4 has connected thereto a chucking device 7 with two clamping jaws 8 movable in opposite direction with regard to each other. The clamping axis of said device 7 is located in the axis 3 of the cutting head 4. The cutting head 4 which with a spindle 9 is journalled in a housing 10, has that side thereof which faces the chucking device 7 provided with radially adjustable and exchangeable cutting jaws 11 for cutting different outer threads. The transmission 6 is arranged substantially within the housing 10. As will be seen from FIG. 2, the housing 10 is connected to the motor housing 13 while an intermediate flange 12 is interposed.

The transmission 6 is designed as planetary gear transmission and is arranged between the spindle 9 and the motor shaft 14 along the axis 3. This transmission comprises a driving wheel in the form of a sun wheel 15 non-rotatably connected to the motor shaft 14 and comprises an output wheel 16 connected to the rear end of the spindle 9. The sun wheel 15 is provided on the circumference of a hollow transmission shaft 17 with which it forms one piece and over which it has a considerably less axial extension. A plurality of planetary gears 18 uniformly distributed about the axis 3 mesh with the circumferential teeth of the sun wheel 15 which is located approximately in the center of the length of the tranmission shaft 17. The planetary gears 18 are journalled on a planetary gear carrier 19 for rotation about axis parallel to the axis 3. This planetary gear carrier 19 has two bearing brackets or plates 20 which are annular disc shaped and are located on both sides of the planetary gear wheels 18. The bearing brackets or plates 20 are provided with bores having the ends of cylindrical axle bolts 21 inserted therein. Each axle bolt 21 is secured axially and against rotation by means of a radial screw 22 inserted into the rear bearing bracket 20. Between the bearing brackets 20 on each axle bolt 21 there is rotatably and axially secured a planetary gear 18 with an anti-friction bearing 23. For purposes of lubricating the anti-friction bearings 23, each bolt 21 is provided with inclined bores 24 which lead to the raceway for the anti-friction bodies. The inclined bores 24 have their mouth located at those outer sides of the axial bolts 21 which face away from the axis 3. The bores 24 in the bearing plates 20 are in communication with feeding bores 25. The feeding bores 25 extend up to the bore of the planetary gear carrier 19 which last mentioned bore has a diameter which is greater than the outer diameter of the transmission shaft 17, so that from this last mentioned bore due to the centrifugal force lubricant can pass to the anti-friction bearings 23.

The output wheel 16 with its inner gear ring 26 meshes with the teeth of all planetary gears 18. Said inner gear ring 26 extends over approximately one half of the length of the planetary gears 18 which half faces the cutting head. Adjacent to the output wheel 16, an inner gear ring 28 meshes with the residual portion of the teeth of all planetary gears 18, said inner gear ring 28 being stationary relative to the housing 10. The inner gear ring 28 is provided on an annular hollow gear 27 which is clamped between the rear end of housing 10 and the intermediate flange 12. This clamping action is effected by means of screws 29 extending parallel to the axis 3 and uniformly distributed about the axis 3, so that said hollow gear 27 after detachment of screws 29 and after pulling off the intermediate flange 12 can likewise be removed. The outer diameter of the planetary gear carrier 18 is shorter than the inner diameter of the hollow wheel 27 so that without difficulties it can be removed over the planetary gear carrier 19 toward the rear. The hollow wheel 27 has both of its end faces provided with projecting collars which are reduced in diameter with regard to the outer diameter of said hollow wheel 27. By means of said collars, the hollow wheel 27 rests against corresponding counter surfaces of housing 10 and intermediate flange 12 while centered relative thereto. The inner gear rings 26, 28 are substantially of uniform design. During the driving of the transmission shaft 17 and sum wheel 15, the planetary gears 18 are turned about their axes and by meshing with the inner gear ring 28 connected to the housing with the planetary gear 19 are turned about the axis 3 so that the output wheel 16 is turned at a speed which is greatly reduced over the speed of the transmission shaft 17.

The spindle 9 is arranged by means of two radial bearings in spaced relationship to each other journalled directly on the housing 10, only the rear radial bearing 30 being visible in FIG. 2.

Directly behind the radial bearing 30 which is designed as ball bearing, the output wheel 16 is centered by means of a hub flange 31 reduced in diameter over the pertaining inner gear ring 26, and connected to the rear end of the spindle 9. The output wheel 16 by means of screws 22 is clamped against the rear end face of spindle 9. These screws 22 are uniformly distributed about the axis 3 and are radial thereto. The front end of the transmission shaft 17 is journalled by means of a radial bearing 33 on the structural part which comprises the spindle 9 and the output wheel 16. The last mentioned radial bearing is located in the hub flange 31 directly adjacent to the rear end of the spindle 9. For purposes of preventing lubricant from entering into the transmission shaft 17 and into the hollow spindle 9, there is provided a seal 34 which is located between the front end face of the radial bearing 33 and an annular disc-shaped rear end wall 35 of the spindle 9 on the outer circumference of the front end of the transmission shaft 17. The rear end of the transmission 17 is journalled by means of a radial bearing 36 directly on the intermediate flange 12. The radial bearing 36 is located adjacent to the front end of a sleeve 37 which extends over those ends of the motor shaft 14 and transmission shaft 17 which face each other and which non-rotatably interconnect said two shafts. On the outer circumference of the sleeve 37 behind the radial bearing 36 there is provided a further seal 38 by means of which an entry of the transmission oil into the motor housing 13 is prevented.

The planetary gear carrier 19 which includes hub sleeves 39 projecting beyond those end faces of the bearing plate 20 which face away from each other is journalled with the front hub sleeve 39 through the intervention of an anti-friction bearing 40 directly on the structural part formed by the spindle 9 and the output wheel 16.

The anti-friction bearing 40 is expediently located within the hub of the output wheel 16 so that an easily mountable and space-saving design will be realized. By the rear hub sleeve 39, the planetary gear carrier 19 is journalled by way of a further anti-friction bearing 41 directly on the intermediate flange 12, while the anti-friction bearing 41 is located ahead of the radial bearing 36. The above outlined design makes it possible to withdraw the intermediate flange 12 toward the rear from housing 10, if necessary, with the motor housng 13 detachably connected to said intermediate flange 12. Subsequently thereto, also the planetary gear carrier 19 including the planetary gears 18 can be pulled out as a unit from the housing 10. After the hollow wheel 27 has been withdrawn and the screws 32 have been loosened, also the output wheel 16 can be withdrawn. The transmission shaft 17 may be detached in a corresponding manner.

The spindle 9 is designed as hollow spindle having an inner diameter greater than the inner diameter of the hollow transmission shaft 17. The diameter of the bore in the annular disc shaped end wall 35 equals the inner diameter of the trasmission shaft 17. As a hollow shaft motor there is provided a motor 5 with a motor shaft 14 having over the entire length thereof the same inner diameter as the transmission shaft 17 and, at the rear end of the motor being open toward the outside. As a result thereof, workpieces with an outer diameter which is less than the inner diameter of the transmission shaft 17 and of the motor shaft 14, can be passed through the entire machine unit 2 and be withdrawn from the rear end of motor 5 so that the length of the workpieces which can be machined with the machine according to the invention is practically unlimited.

It is, of course, to be understood that the present invention is, by no means, limited to the specific showing in the drawings, but also comprises any modifications within the scope of the appended claims.

What is claimed is:

1. A thread cutting machine, which includes in combination: housing means, a cutting head with an axis and spindle means therewith journalled in said housing means, motor means having an axis arranged in axial alignment with said cutting head, and a planetary gear transmission with a main axis and having an input gear drivingly connected to said motor means and also having an output gear drivingly connected to said cutting head, said planetary gear transmission being arranged between said motor means and said cutting head, the main axis of said planetary gear transmission being in alignment with the axis of said motor means and with the axis of said cutting head.

2. A machine in combination according to claim 1, in which said transmission comprises passage means substantially axially aligned with both said cutting head and said motor means and extending from said cutting head into said motor means.

3. A machine in combination according to claim 2, in which said motor means has a hollow motor shaft, and in which said passage means communicates with the interior of said hollow motor shaft.

4. A machine in combination according to claim 3, in which said transmission includes a hollow transmission shaft having its outer periphery provided with said input gear meshing with planetary gears of said planetary gear transmission, said planetary gear transmission also including a hollow planetary gear carrier arranged around said hollow transmission shaft and carrying said planetary gears, said housing means and said output gear respectively being provided with inner gear rings meshing with said planetary gears.

5. A machine in combination according to claim 4, in which said inner gear rings are arranged directly adjacent to each other and in which that inner gear ring which is provided on said housing means is located on that side of said output gear which faces away from said cutting head.

6. A machine in combination according to claim 4, in which said inner gear rings have equal diameters but differ in the number of their teeth.

7. A machine in combination according to claim 4, in which the axial extension of said inner gear rings is substantially the same.

8. A machine in combination according to claim 4, in which said output gear is provided with a hub flange drivingly connected to said spindle means, said hub flange having a diameter shorter than the outer diameter of the inner gear ring of said output gear.

9. A machine in combination according to claim 4, which includes bearing means arranged within said housing means on opposite sides of said input gear and journalling said transmission shaft.

10. A machine in combination according to claim 9, in which one of said bearing means is arranged adjacent said spindle means whereas the other one of said bearing means is located in said housing means near said motor.

11. A machine in combination according to claim 4, which includes two anti-friction bearing means respectively arranged on both sides of said planetary gears and journalling said planetary gear carrier.

12. A machine in combination according to claim 11, in which one of said anti-friction bearing means is arranged in said output gear whereas the other one of said anti-friction bearing means is arranged in a portion of said housing means.

13. A machine in combination according to claim 9, in which said bearing means adjacent said motor and said anti-friction bearing means adjacent said motor are arranged on the same part of said housing means.

14. A machine in combination according to claim 13, in which said same part of said housing means is formed by a detachable intermediate flange member arranged between the remainder of said housing means and said motor.

15. A machine in combination according to claim 4, in which the inner gear ring of said housing means is arranged between said motor and that portion of said housing means which is adjacent said output gear.

16. A machine in combination according to claim 14, in which the inner gear ring of said housing means is arranged between said intermediate flange member and that portion of said housing means which is adjacent said output gear.

* * * * *